(No Model.) 3 Sheets—Sheet 1.
M. KANE.
SHEAF CARRIER FOR HARVESTERS.
No. 413,255. Patented Oct. 22, 1889.
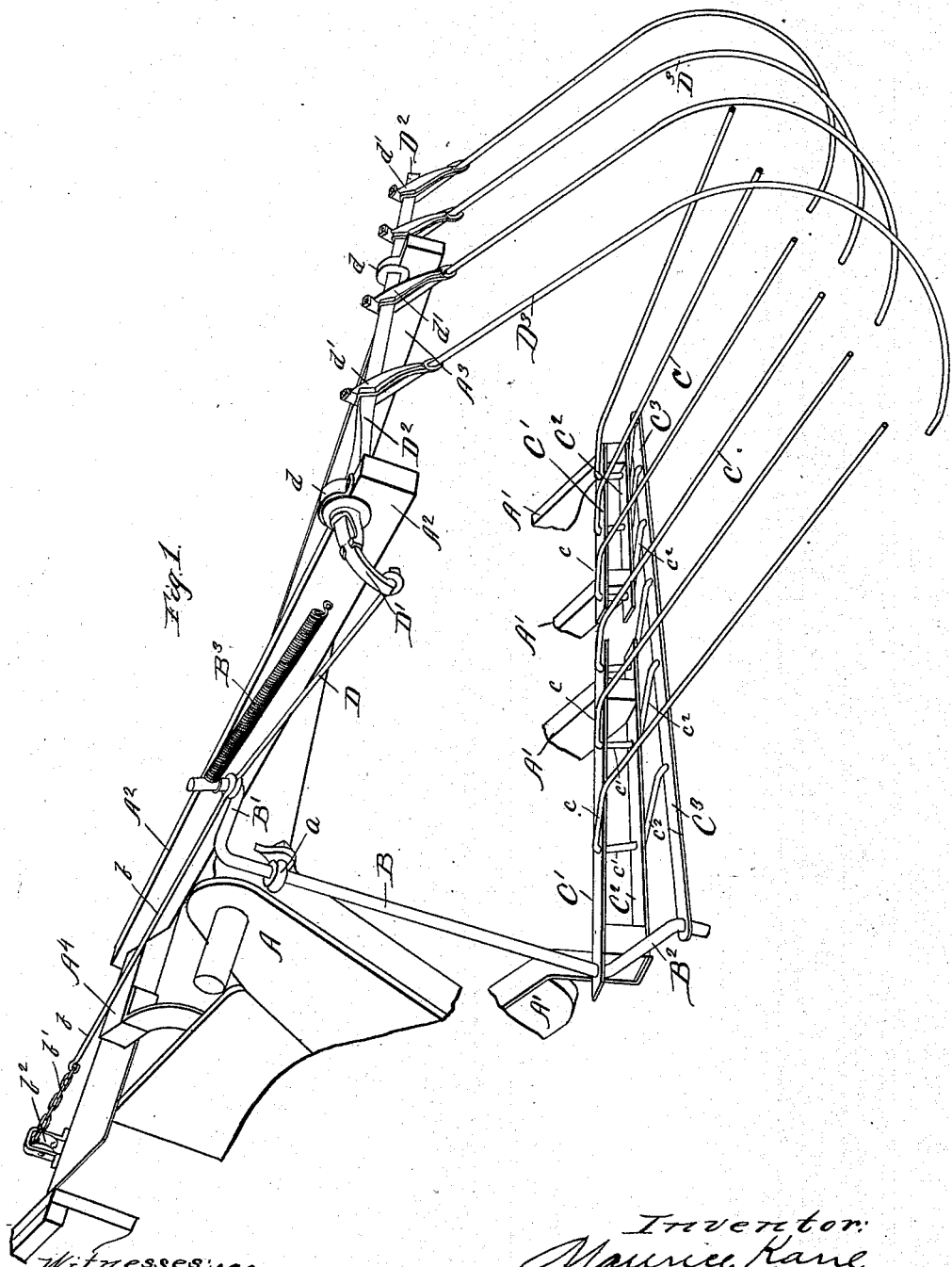

(No Model.) 3 Sheets—Sheet 2.
M. KANE.
SHEAF CARRIER FOR HARVESTERS.
No. 413,255. Patented Oct. 22, 1889.
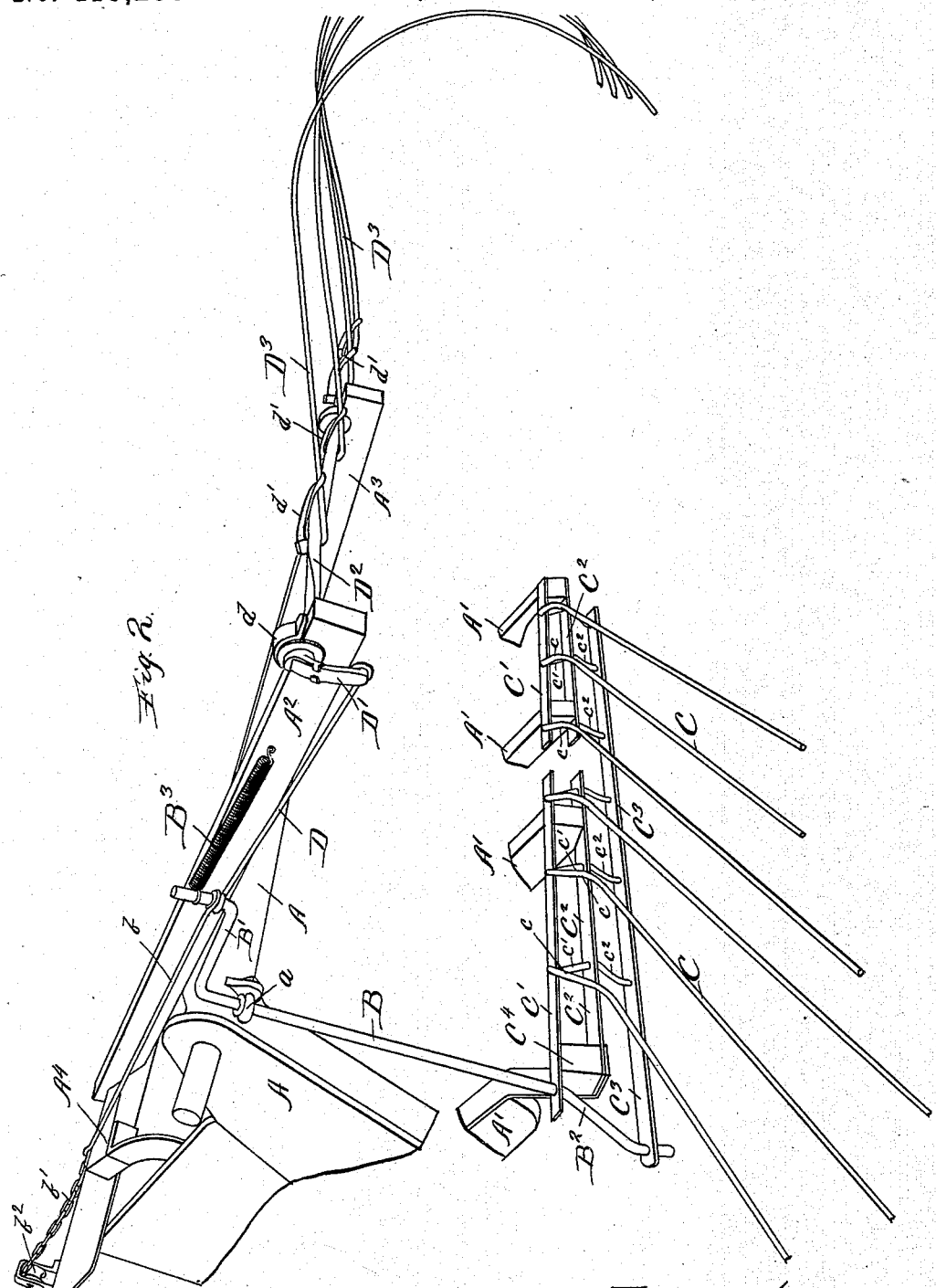

(No Model.) 3 Sheets—Sheet 3.
M. KANE.
SHEAF CARRIER FOR HARVESTERS.
No. 413,255. Patented Oct. 22, 1889.
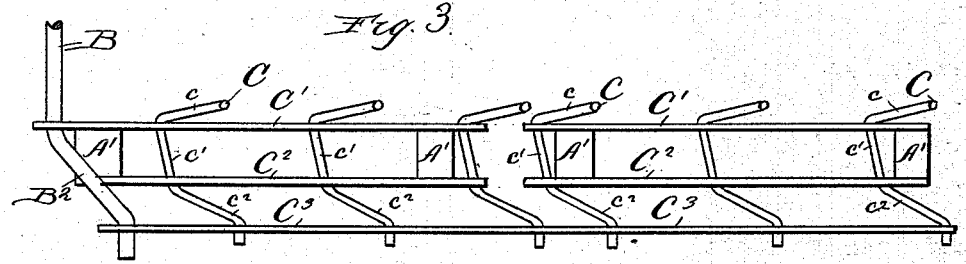
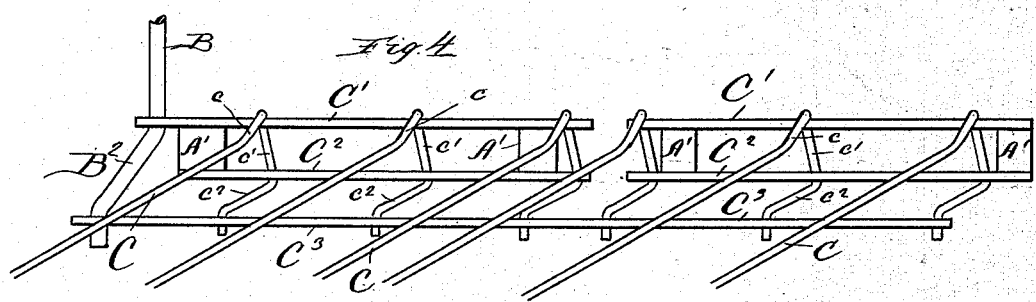
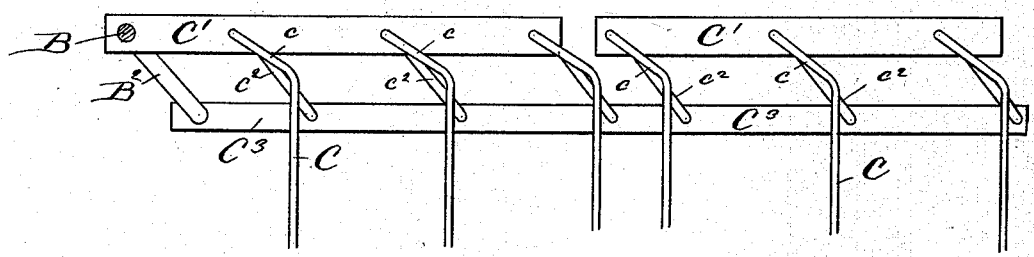
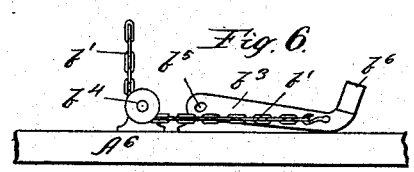
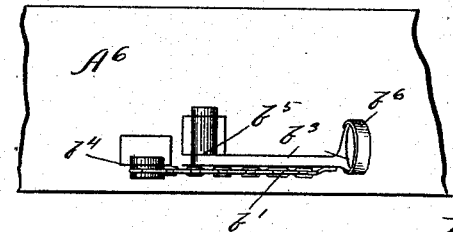
Witnesses:
Inventor:
Maurice Kane,
by his atty
A. P. Smith

UNITED STATES PATENT OFFICE.

MAURICE KANE, OF CHICAGO, ILLINOIS, ASSIGNOR TO THE WARDER, BUSHNELL & GLESSNER COMPANY, OF SAME PLACE.

SHEAF-CARRIER FOR HARVESTERS.

SPECIFICATION forming part of Letters Patent No. 413,255, dated October 22, 1889.

Application filed July 6, 1889. Serial No. 316,727. (No model.)

*To all whom it may concern:*

Be it known that I, MAURICE KANE, a citizen of the United States, residing at Chicago, in the county of Cook and State of Illinois, have invented certain new and useful Improvements in Sheaf-Carriers for Harvesters; and I do hereby declare the following to be a full, clear, and exact description of the invention, such as will enable others skilled in the art to which it appertains to make and use the same.

My invention consists in the improved form of sheaf or bundle carriers for harvesters, hereinafter to be described and claimed.

In the drawings, Figure 1 represents my invention as attached to the binder-frame of a harvesting-machine. Fig. 2 represents the same, the sheaf-carrier being in a position to dump the sheaf or bundle of sheaves which may have collected in it. Fig. 3 is a detail view showing the manner in which the lower fingers are pivoted. Fig. 4 is the same, showing the lower fingers when folded back. Fig. 5 is a plan view of a slightly-modified form, with the fingers in operative position. Figs. 6 and 7 are detail views of the treadle for operating the sheaf-carrier.

My improved sheaf-carrier belongs to what may be called the "double-acting" variety, inasmuch as both the upper and lower fingers are operated when the sheaf is to be dumped.

I have shown the sheaf-carrier as attached to a binder-frame, in which A is the upright, and A' A' represent the timbers upon which the binder-table is supported.

$A^2$ and $A^3$ represent timbers, which are attached at the upper portion of the binder-frame to the cross-piece $A^4$, in order that the upper depending fingers of the sheaf-carrier may be supported therefrom.

B is a double-crank shaft journaled on the binder-frame by the bearing $a$, and having the two cranks B' and $B^2$.

$B^3$ is a sufficiently powerful spring attached to the timber $A^2$ at one end and to the crank B' at the other.

The lower fingers C C are mounted in the perforated strips C' and $C^2$, or equivalent bearings attached to the binder-table. The greater portion of these fingers C have a downward inclination, as well shown in Fig. 1; but a portion of each, $c$, is nearly horizontal, and this again is bent at a right angle in the portion $c'$ and back again in a portion $c^2$, parallel to the portion $c$. The fingers C, being thus pivoted in vertical or approximately vertical bearings, are connected together by a link or push bar $C^3$, which is also connected to the crank $B^2$. Consequently when the crank-shaft B is rocked or partially rotated the fingers C will all fold back upon themselves, and if the pivoted bearings are not vertical they will also have a slight downward motion as they are thus folded backward.

From the upper crank B' there extends a link or connecting rod D to the crank D' upon the rock-shaft $D^2$. This rock-shaft $D^2$ is supported upon the projecting timbers $A^2$ $A^3$, and held in its bearings by means of the strips $d\ d$. To this rock-shaft, which is preferably made of a square or polygonal form, are attached the depending fingers $D^3$ by means of the recessed clamps $d'\ d'$ or equivalent means. From the same crank B', or from any equivalent portion of the double-crank shaft B which may prove convenient, there extends a rod or chain $b$, which, as shown in the drawings, consists partly of the rod $b$, to which a chain $b'$ is attached, which loops over a pulley $b^2$ and thence under a pulley $b^4$, as shown in Figs. 6 and 7, to a lever or treadle $b^3$, which is pivoted upon the seat-board $A^6$ by the pivoted bearing $b^5$. This treadle has a strap $b^6$, under which the operator may insert the toe of his boot. The pivotal point $b^5$, or fulcrum upon which the lever $b^3$ revolves, is placed at such a height that when the treadle is folded down upon the seat-board, as shown in Fig. 6, the line of thrust upon it by the chain $b'$ is below the said fulcrum $b^5$.

In the detail view shown in Fig. 5 the portions $c$ on the lower fingers C are bent at a considerable angle to the main portions of the fingers when viewed in a horizontal plane, as shown. This does not affect the operation of the said fingers in any way, but simply permits of their being folded back a little more closely together than when they are constructed without this angularity between the parts C and $c$, as shown in Fig. 1.

The method of operating my invention is the following: When the operator desires to dump the sheaf-carrier, he lifts the lever or treadle $b^3$ by inserting the foot in the loop or band $b^6$ until the line of thrust upon the said treadle by the chain $b'$ is above the fulcrum $b^5$. After that point is reached the spring $B^3$ operates to retract the said lever or treadle and simultaneously swing the upper depending fingers $D^3$ upward and fold the lower fingers C backward and downward through the agency of the double-crank shaft B, all as shown in Fig. 2. To readjust the sheaf-carrier in operative position, the operator simply presses down upon the treadle $B^3$, thereby placing the spring $B^3$ under tension until the chain $b'$ is below the bearing $b^5$, after which the apparatus is locked in position and will remain so until again tripped by the lifting of the treadle $b^3$.

Having therefore described my invention, what I claim as new, and desire to protect by Letters Patent, is—

1. In a sheaf-carrier, the combination, with the binder-frame, of the upper depending fingers mounted on a rock-shaft, the lower fingers supported on vertical or approximately vertical pivots, a suitable link connecting said lower fingers together so that they are vibrated in unison, a double-crank shaft, and suitable connections between the upper crank on said crank-shaft and a crank on the before-mentioned rock-shaft, together with suitable connections between the lower crank on said crank-shaft and the before-mentioned link, substantially as described.

2. In a sheaf-carrier, the combination, with the binder-frame, of the upper depending fingers mounted on a rock-shaft, the lower fingers supported on vertical or approximately vertical pivots, a suitable link connecting said lower fingers together so that they are vibrated in unison, a double-crank shaft, and suitable connections between the upper crank on said crank-shaft and a crank on the before-mentioned rock-shaft, together with suitable connections between the lower crank on said crank-shaft and the before-mentioned link, a spring for turning said double-crank shaft and dumping the sheaf, and a treadle connected to said crank-shaft, by which the sheaf-carrier may be readjusted in position, substantially as described.

3. In a sheaf-carrier, the combination of the pivoted fingers, the spring which tends to swing said fingers about their pivots in the direction to dump the sheaf-carrier, together with the treadle and connections which act to readjust the pivoted fingers in position, the said connections being such that when the said treadle is down upon the seat-board the line of thrust upon it passes below the fulcrum on which it turns, substantially as described.

4. In a sheaf-carrier, the combination of the binder-frame, upper and lower sets of vibratable fingers, suitable connections between said sets of fingers, and a common lever, together with a spring, which tends to draw said lever in the direction to swing the two sets of vibratable teeth apart, whereby through the vibration of the lever in one direction and its automatic retraction by the spring the two sets of vibratable fingers are simultaneously operated, substantially as described.

In testimony whereof I affix my signature in presence of two witnesses.

MAURICE KANE.

Witnesses:
R. C. HASKINS,
A. V. STEWART.